United States Patent
Yoon

(10) Patent No.: US 11,030,500 B2
(45) Date of Patent: Jun. 8, 2021

(54) CODE PROCESSING DEVICE AND CODE PROCESSING METHOD

(71) Applicant: Tae Seok Yoon, Seoul (KR)

(72) Inventor: Tae Seok Yoon, Seoul (KR)

( * ) Notice: Subject to any disclaimer, the term of this patent is extended or adjusted under 35 U.S.C. 154(b) by 56 days.

(21) Appl. No.: 16/347,133

(22) PCT Filed: Oct. 17, 2017

(86) PCT No.: PCT/KR2017/011451
§ 371 (c)(1),
(2) Date: May 2, 2019

(87) PCT Pub. No.: WO2018/084458
PCT Pub. Date: May 11, 2018

(65) Prior Publication Data
US 2020/0057928 A1 Feb. 20, 2020

(30) Foreign Application Priority Data
Nov. 7, 2016 (KR) .................. 10-2016-0147392

(51) Int. Cl.
*G06K 19/06* (2006.01)
*G06K 9/00* (2006.01)
*G06Q 20/32* (2012.01)

(52) U.S. Cl.
CPC ... *G06K 19/06037* (2013.01); *G06K 9/00442* (2013.01); *G06K 19/06028* (2013.01); *G06Q 20/3276* (2013.01)

(58) Field of Classification Search
CPC ....... G06K 19/06037; G06K 19/06028; G06Q 20/3276

USPC ............................................ 235/462.04, 469
See application file for complete search history.

(56) References Cited

U.S. PATENT DOCUMENTS

| 6,572,025 B1* | 6/2003 | Nishikado | G06K 1/123 235/494 |
| 2012/0000983 A1* | 1/2012 | Bhagwan | G06K 7/146 235/462.04 |
| 2013/0092738 A1* | 4/2013 | Blasinski | G06K 7/10821 235/462.04 |

(Continued)

FOREIGN PATENT DOCUMENTS

| JP | 2008-533552 | 8/2008 |
| KR | 10-2014-0067423 A | 6/2014 |

(Continued)

OTHER PUBLICATIONS

English Specification of 10-2016-0118912.

(Continued)

*Primary Examiner* — Paultep Savusdiphol
(74) *Attorney, Agent, or Firm* — Aslan Law, P.C.

(57) ABSTRACT

Provided is a code processing method comprising: a code registering step of matching an RGB code and identification information so as to generate a code database; and a recognizing step of extracting at least one RGB code from the color code and recognizing identification information corresponding to the at least one RGB code by using the code database in which the identification information according to the RGB code has been stored in advance, when a color code is received from a recognition request terminal.

12 Claims, 10 Drawing Sheets

(56) References Cited

U.S. PATENT DOCUMENTS

| | | | | |
|---|---|---|---|---|
| 2013/0140354 A1* | 6/2013 | Fan | ................. | G06K 19/06037 |
| | | | | 235/375 |
| 2013/0221105 A1 | 8/2013 | Cheong et al. | | |
| 2014/0144991 A1* | 5/2014 | Tian | .................... | G06K 7/1443 |
| | | | | 235/462.04 |
| 2016/0379029 A1* | 12/2016 | Fang | ................. | G06K 7/10732 |
| | | | | 235/462.04 |
| 2016/0379031 A1* | 12/2016 | Fang | .................... | G06K 7/1443 |
| | | | | 235/462.04 |
| 2017/0344776 A1* | 11/2017 | Sharma | ................ | G06K 7/1443 |

FOREIGN PATENT DOCUMENTS

| | | |
|---|---|---|
| KR | 10-2014-0093792 A | 7/2014 |
| KR | 10-2014-0094057 A | 7/2014 |
| KR | 10-1420361 | 7/2014 |
| KR | 10-2016-0118912 | 10/2016 |
| KR | 10-2016-0122465 | 10/2016 |

OTHER PUBLICATIONS

English Specification of 10-1420361.
English Abstract of 2008-533552.
English Specification of 10-2016-0122465.

* cited by examiner

Fig. 6

| Surface Area of the earth in 1x1 centimeter | 2,601,734,451,840,000,000,000,000,000 | # of codes | Indicator (1:good, 0: not good) |
|---|---|---|---|
| #of cases from hexadecimal A combination of four colors (0,0,0),(0,0,0), (0,0,0),(0,0,0) ~ (255,255,255),(255,255,255), (255,255,255),(255,255,255) | 256 | 1 | 0 |
| | 65,536 | 2 | 0 |
| | 16,777,216 | 3 | 0 |
| | 4,294,967,296 | 4 | 0 |
| | 1,099,511,627,776 | 5 | 0 |
| | 281,474,976,710,656 | 6 | 0 |
| | 72,057,594,037,927,900 | 7 | 0 |
| | 18,446,744,073,709,600,000 | 8 | 0 |
| | 4,772,366,482,869,650,000,000 | 9 | 0 |
| | 1,208,925,819,614,630,000,000,000 | 10 | 0 |
| | 309,485,009,821,345,000,000,000,000 | 11 | 0 |
| | 79,228,162,514,264,300,000,000,000,000 | 12 | 1 |

| Radius of the earth in 1 centimeter | 406,801,596,100,000,000 | # of codes | Indicator (1:good, 0: not good) |
|---|---|---|---|
| #of cases from hexadecimal A combination of THREE colors (0,0,0),(0,0,0),(0,0,0) ~ (255,255,255),(255,255,255), (255,255,255) | 256 | 1 | 0 |
| | 65,536 | 2 | 0 |
| | 16,777,216 | 3 | 0 |
| | 4,294,967,296 | 4 | 0 |
| | 1,099,511,627,776 | 5 | 0 |
| | 281,474,976,710,656 | 6 | 0 |
| | 72,057,594,037,927,900 | 7 | 0 |
| | 18,446,744,073,709,600,000 | 8 | 1 |
| | 4,772,366,482,869,650,000,000 | 9 | 1 |
| | 1,208,925,819,614,630,000,000,000 | 10 | 1 |
| | 309,485,009,821,345,000,000,000,000 | 11 | 1 |
| | 79,228,162,514,264,300,000,000,000,000 | 12 | 1 |

| Height of the atomsphere in 1 cetimiter | 2,890,000,000,000 | # of codes | Indicator (1:good, 0: not good) |
|---|---|---|---|
| #of cases from hexadecimal A combination of TWO colors (0,0,0),(0,0,0) ~ (255,255,255),(255,255,255) | 256 | 1 | 0 |
| | 65,536 | 2 | 0 |
| | 16,777,216 | 3 | 0 |
| | 4,294,967,296 | 4 | 0 |
| | 1,099,511,627,776 | 5 | 0 |
| | 281,474,976,710,656 | 6 | 1 |
| | 72,057,594,037,927,900 | 7 | 1 |
| | 18,446,744,073,709,600,000 | 8 | 1 |
| | 4,772,366,482,869,650,000,000 | 9 | 1 |
| | 1,208,925,819,614,630,000,000,000 | 10 | 1 |
| | 309,485,009,821,345,000,000,000,000 | 11 | 1 |
| | 79,228,162,514,264,300,000,000,000,000 | 12 | 1 |

Fig.7

| Time period:from BC3500 to AD3000 devided by 1/100secs | #of cases from hexadecimal A combination of TWO colors (0.0.0),(0.0.0) ~ (255.255.255),(255.255.255) | # of codes | Indicator (1:good,0: not good) |
|---|---|---|---|
| 20,498,400,000,000 | 256 | 1 | 0 |
| | 65,536 | 2 | 0 |
| | 16,777,216 | 3 | 0 |
| | 4,294,967,296 | 4 | 0 |
| | 1,099,511,627,776 | 5 | 0 |
| | 281,474,976,710,656 | 6 | 1 |
| | 72,057,594,037,927,900 | 7 | 1 |
| | 18,446,744,073,709,600,000 | 8 | 1 |
| | 4,772,366,482,869,650,000,000 | 9 | 1 |
| | 1,208,925,819,614,630,000,000,000 | 10 | 1 |
| | 309,485,009,821,345,000,000,000,000 | 11 | 1 |
| | 79,228,162,514,264,300,000,000,000,000 | 12 | 1 |

Fig. 8

| Surface Area of the earth in 1x1 centimeter | # of cases from hexadecimal A combination of four colors (0,0,0),(0,0,0), (0,0,0),(0,0,0) ~ (255,255,255),(255,255,255), (255,255,255),(255,255,255) | # of codes | Indicator (1:good,0: not good) |
|---|---|---|---|
| 2,601,734,451,840,000,000,000,000 | | 1 | 0 |
| 256 | | 2 | 0 |
| 65,536 | | 3 | 0 |
| 16,777,216 | | 4 | 0 |
| 4,294,967,296 | | 5 | 0 |
| 1,099,511,627,776 | | 6 | 0 |
| 281,474,976,710,656 | | 7 | 0 |
| 72,057,594,037,927,900 | | 8 | 0 |
| 18,446,744,073,709,600,000 | | 9 | 0 |
| 4,772,366,482,869,650,000,000 | | 10 | 0 |
| 1,208,925,819,614,630,000,000,000 | | 11 | 0 |
| 309,485,009,821,345,000,000,000,000 | | 12 | 1 |
| 79,228,162,514,264,300,000,000,000,000 | | | |

CODE PROCESSING DEVICE AND CODE PROCESSING METHOD

TECHNICAL FIELD

The present invention relates to a code processing device and code processing method, and more specifically, to a code processing device and code processing method of processing a color code constituted of colors defined in RGB code.

BACKGROUND ART

Various codes easily readable or inputtable on computers are recently being used to efficiently transfer various pieces of information.

One-dimensional codes have conventionally been used. 'UPC CODE" or "EAN CODE" are among such one-dimensional codes in which various bars or such shapes of straight lines are horizontally arrayed at gaps and widths and have information printed therein. So-call "bar code" belongs to such one-dimensional codes.

As transfer of information using code is more frequent and for the purpose of transferring more diversified information using code, two-dimensional codes come into availability.

As smartphones recently become commonplace, sharply increasing over the entire industry is use of QR code which is rectangular and is able to contain a few tens to a few hundreds of times more of information than barcode can and is in wide use in various sectors including routine payment, commercial advertisements, and business card business.

QR code comes in a horizontal-vertical, two-dimensional shape and is able to contain more information and may store multi-lingual character data of, e.g., Chinese and Japanese, as well as English alphabet and numbers. QR code is an advanced version of conventional one-dimensional barcode in light of data representation range and quantity. Generally, QR codes may be printed statistically in printing media or generated on website screens or smartphones or other mobile terminals.

Further, QR code is produced to be easily recognized on means (e.g., smartphones) capable of capturing an image and processing information about the captured image. While conventional one-dimensional barcode may store only numerical information of 20 letters or more or less, QR code may contain a few tens of letters to 1,800 letters. Such information contained in a QR code may be decoded by a QR reader, e.g., smartphone. QR code may be more advantageous in storing letter types of data, e.g., alphabet or numbers, than normal barcode and, by its superior recognition speed and rate and restoration, is being used more and more for marketing or advertisement purposes.

However, such two-dimensional code also has its own limitation in the type of information that it may represent and its stereotypical shape causes it less applicable.

One-dimensional code or two-dimensional code requires a minimum size for recognition to be secured and, in a smaller size, may be substantially impossible to scan.

DETAILED DESCRIPTION OF THE INVENTION

Technical Problem

To address the foregoing issues, according to the present invention, there is provided a code processing device and code processing method of recognizing a color code constituted of colors defined in RGB code.

Technical Solution

To achieve the above objects, according to an embodiment, a code processing device comprises a code receiving unit receiving a color code from a recognition requesting terminal, a code recognizing unit extracting at least one RGB code from the color code and recognizing identification information corresponding to the at least one RGB code using a code database storing identification information according to RGB codes, and a code providing unit transmitting the identification information to the recognition requesting terminal.

At this time, the code receiving unit may extract the color code with a preset shape from an electronic document received from the recognition requesting terminal.

Further, the code receiving unit may split the color code into preset regions, extract an RGB code from each of the regions, and retrieve identification information corresponding to a plurality of RGB codes extracted from the code database.

Further, the code database may include at least one of a position information database in which a position and an RGB code match each other, a time information database in which a time and an RGB code match each other, and a user information database in which user information entered by an issuance requesting terminal and an RGB code match each other.

Further, the code recognizing unit may determine a database to recognize the RGB code extracted from each region according to a position of the region.

Further, the code processing device may further comprise a code registering unit splitting a designated position into a plurality of areas according to a preset reference and matching a different RGB code to each of the areas to generate the position information database.

Further, the code processing device may further comprise a code registering unit matching the user information with an RGB code to which no RGB code is matched if the user information including company information or product information is received.

To achieve the above objects, according to an embodiment, a code processing method comprises a code registering step of matching an RGB code with identification information to generate a code database; and a recognizing step, if receiving a color code from a recognition requesting terminal, extracting at least one RGB code from the color code and recognizing identification information corresponding to the at least one RGB code using a code database previously storing identification information according to RGB codes.

At this time, the code registering step may include the steps of splitting a designated position into a plurality of areas according to a preset reference and matching a different RGB code to each of the areas to generate a position information database and, if user information including company information or product information is received from an issuance requesting terminal, matching the user information with an RGB code to which no information is matched to update a user information database.

Further, the code processing method may further comprise the steps of: discovering a first RGB code corresponding to a position received from the issuance requesting terminal using the position information database; discovering a second RGB code corresponding to the user information using the user information database; and transmitting, to the issuance requesting terminal, the color code in which a color of a first region is selected according to the first RGB code and a color of a second region is selected according to the second RGB code.

Further, the recognizing step may further include the steps of extracting the color code from an electronic document received from the recognition requesting terminal; splitting the extracted color code into the first region and the second region according to a preset reference; extracting an RGB code corresponding to a color extracted from each region; discovering an area corresponding to an RGB code extracted from the first region using the position information database, discovering user information corresponding to an RGB code extracted from the second region using the user information database; and transmitting information about the discovered area and the user information to the recognition requesting terminal.

Advantageous Effects

As set forth above, there may be provided a code processing device and code processing method of processing a color code constituted of color(s) defined as RGB, thereby providing more various detailed pieces of identification information to the user.

Further, there may be provided a code processing device and code processing method that provides increased data management and efficiency and compatibility with various applications by processing color code according to RGB codes processed in hexadecimal.

Further, information may be provided using a color code constituted of colors, thereby enabling a processing of color code although the code is modified or made smaller.

BRIEF DESCRIPTION OF DRAWINGS

FIG. 6 is a view illustrating two-dimensional area information matching a color code;

FIG. 7 is a view illustrating three-dimensional area information matching a color code;

FIG. 8 is a view illustrating time information matching a color code;

MODE FOR CARRYING OUT THE INVENTION

Advantages and features of the present disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims.

For use in embodiments of the present invention, common terms widely used as possible have been chosen considering functions in the disclosure, but the terms may be varied depending on the intent of one of ordinary skill in the art or case laws or the advent of new technologies. In certain cases, some terms may be arbitrarily selected by the applicant, and in such case, their detailed definitions may be given in the relevant parts thereof. Accordingly, the terms used herein should be determined based on their meanings and the overall disclosure, rather than by the terms themselves. Hereinafter, embodiments of the present invention are described in detail with reference to the accompanying drawings.

Figure 1:
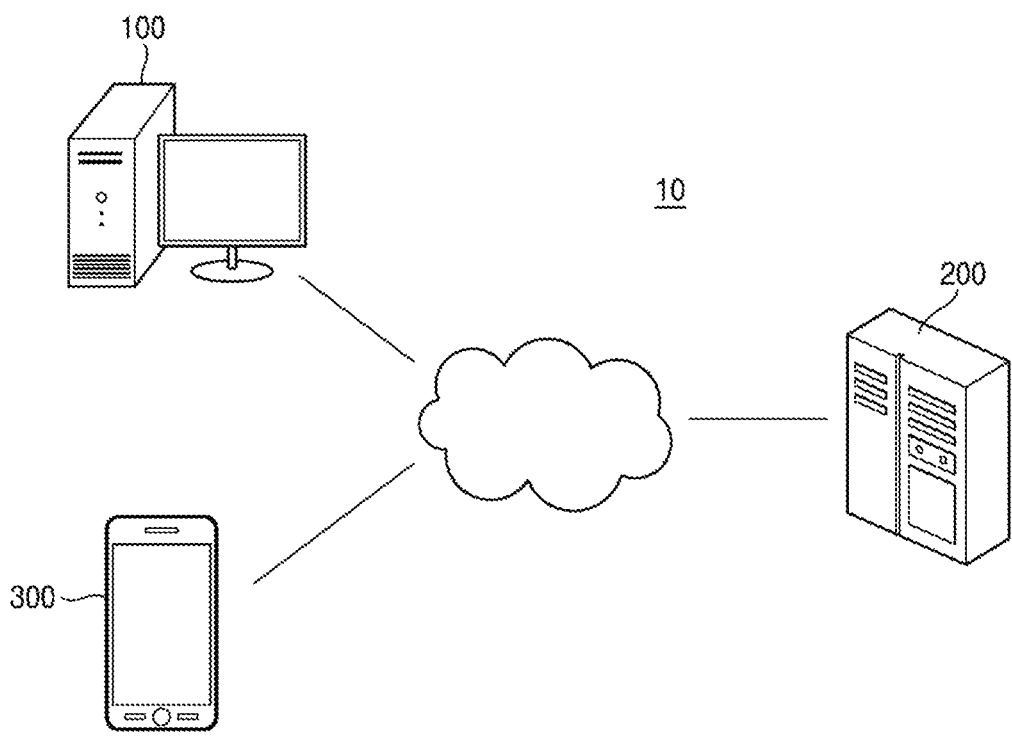
FIG. 1 is a view schematically illustrating a code processing system of processing a color code according to an embodiment.

FIG. 1 is a view schematically illustrating a code processing system 10 of processing a color code according to an embodiment.

FIGS. 2 to 5 are views illustrating an example color code processed by a code processing system 10 according to an embodiment. FIGS. 6 to 8 are views illustrating various pieces of identification information matching a color code.

Referring to FIG. 1, according to an embodiment, a code processing system 10 includes an issuance requesting terminal 100, a recognizing requesting terminal 300, and a code processing device 200 and may recognize a color code and provide identification information corresponding to the color code.

The issuance requesting terminal 100 may transmit predetermined information and request the code processing device 200 to issue a color code. Specifically, the issuance requesting terminal 100 may transmit user information, such as company information or product information which is to match the color code, or identification information, e.g., location or time, managed by a color code and receive a color code corresponding thereto.

If an identification code is issued from the code processing device 200, the issuance requesting terminal 100 may electronically display the identification code on an electronic document, e.g., web or word document, and distributes the same. For example, the issuance requesting terminal 100 may upload it onto an electronic document web containing the identification code or electronically transmit the identification code to a recognition requesting device.

The issuance requesting terminal 100 may be an information processing device used in a fixed position, e.g., a desktop PC, as shown in FIG. 1 but is not limited thereto and may be replaced with a portable information processing device, such as a smartphone, portable media player (PMP), personal digital assistant (PDA), or tablet PC.

The recognizing requesting terminal 300 may transmit the color code or the color code-containing electronic document to the code processing device 200 to thereby request the code processing device 200 to recognize the color code. At this time, the color code may be one obtained in a method free from color loss. For example, the color code may be one electronically transmitted from the issuance requesting terminal 100 or one obtained via the web.

Further, the recognizing requesting terminal 300 may receive identification information corresponding to the color code from the code processing device 200 and provide to the user corresponding to the received identification information.

The recognizing requesting terminal 300 may be a smartphone as shown in FIG. 1 but it should be appreciated that it may be replaced with an information processing device used in a fixed position, e.g., a desktop PC, or a portable information processing device, such as a smartphone, portable media player (PMP), personal digital assistant (PDA), or tablet PC.

The code processing device 200 may issue a color code at the request of the issuance requesting terminal 100. At this time, the color code may be constituted of at least one color. The color constituting the color code may be determined according to identification information pre-registered in the code processing device 200 or user information transmitted from the issuance requesting terminal 100.

Further, the code processing device 200 may match each RGB code to the identification information and store them, use them to recognize the color code transmitted from the recognizing requesting terminal, and transmit the identification information corresponding to the recognized color code to the recognizing requesting terminal 300.

Prior to describing the code processing device 200, a color code 20 processed by a code processing system 10 is described below in detail with reference to FIGS. 2 to 8.

The color code 20 processed by the code processing system 10 according to an embodiment may be constituted of at least one color. At this time, the colors constituting the color code 20 may be defined in RGB code.

Colors represented on an information processing device, e.g., laptop PC or smartphone, are generally defined in an RGB color model. As per the RGB color model, each color may be represented with a mix of three primary light colors, i.e., red, green, and blue.

Specifically, since each primary color is represented as a value from 0 to 255 depending on its brightness, the RGB code may be defined as a value from (0,0,0) to (255,255,255) depending on the color. For example, for the RGB code, black may be defined as (0,0,0), white as (255,255,255), red as (255,0,0), green as (0,255,0), blue as (0,0,255), and violet (magenta), which is a mix of red and blue, may be defined as (255,0,255).

Since such RGB code is constituted of a multiple of 16, it may be processed in the form of a hexadecimal number and, accordingly, presents an advantage of easy processing in registering or recognizing the color code 20.

The color code 20 is constituted of at least one color defined in the above-described RGB code. At this time, the number of pieces of identification information that may be mapped to the color code 20 may be determined depending on the number of the colors constituting the color code 20.

For example, where the color code 20 is constituted of one color, since the RGB code has a value ranging from (0,0,0) to (255,255,255), the color code 20 may match 16,777,216 different pieces of identification information and, where the color code 20 is constituted of four colors, 256^12 different pieces of identification information may match the color code 20.

Figure 2:
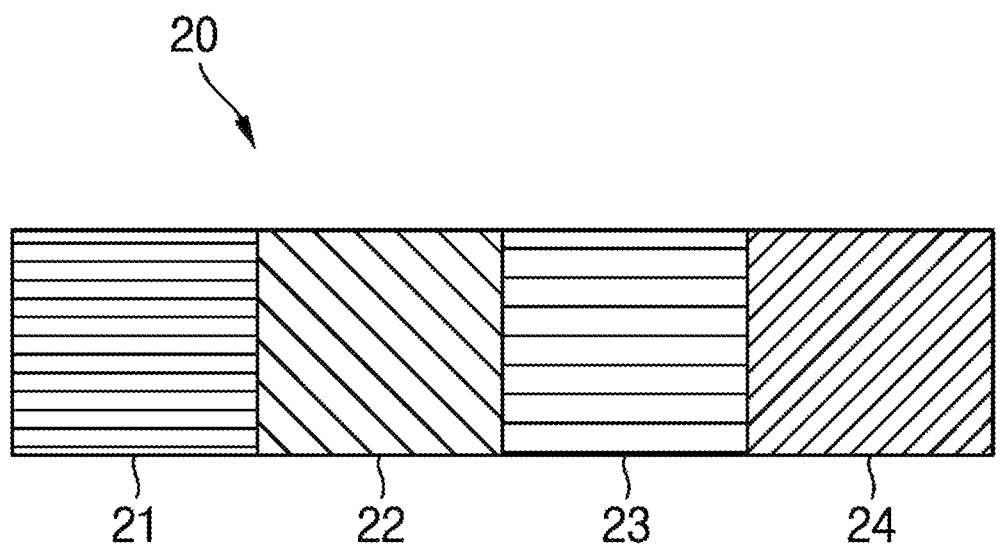
FIG. 2 is a view illustrating an example color code processed by a code processing system according to an embodiment.
Figure 3:
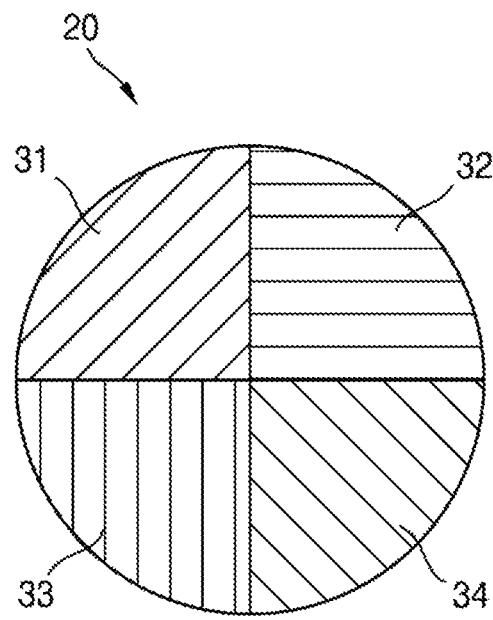
FIG. 3 is a view illustrating another example color code processed by a code processing system according to an embodiment.
Figure 4:
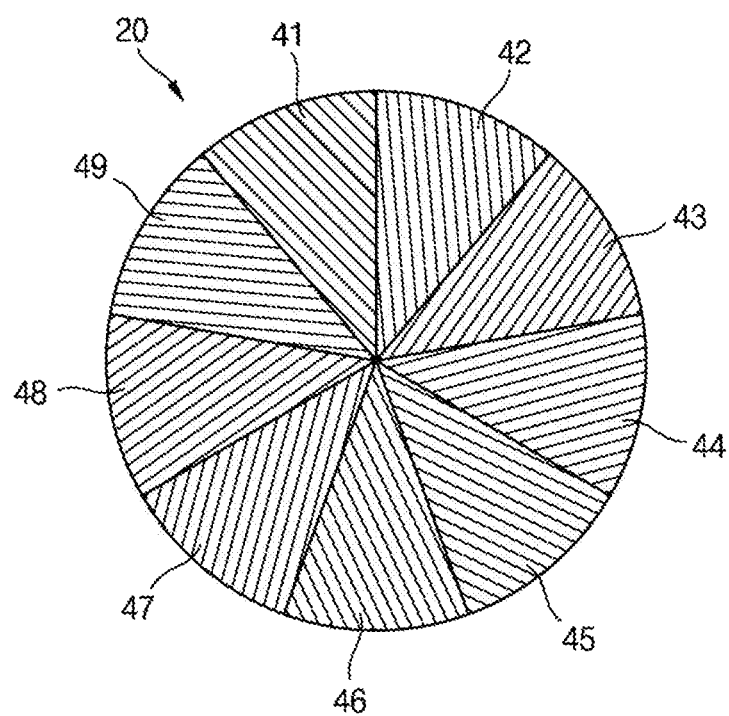
FIG. 4 is a view illustrating still another example color code processed by a code processing system according to an embodiment.
Figure 5:
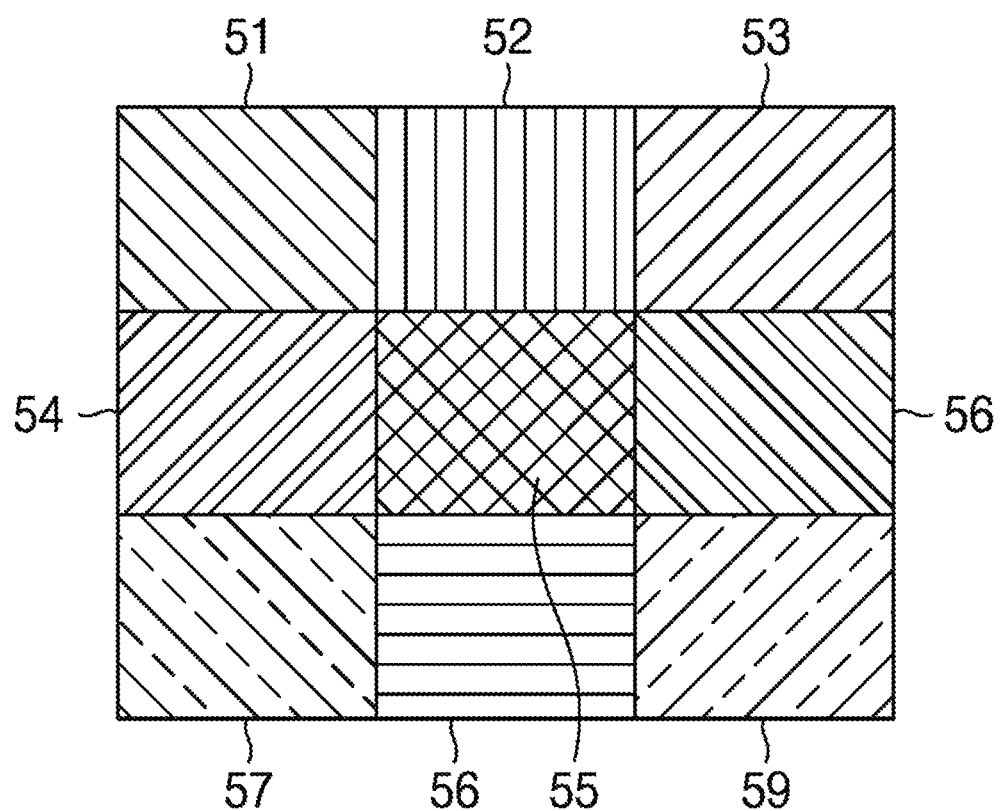
FIG. 5 is a view illustrating yet still another example color code processed by a code processing system according to an embodiment.

That is, the color code 20 may be constituted of a plurality of regions where different colors may be represented. For example, the color code 20 may be constituted of four regions where four colors may be represented as shown in FIGS. 2 and 3 or eight regions where eight colors are representable as shown in FIGS. 4 and 5, or as necessary, may be constituted of more colors.

Meanwhile, the colors constituting the color code 20 may be determined according to the RGB code matching the identification information. At this time, the identification information means information that is matched to each RGB code and is providable through the color code 20, such as position information indicating the position, time information indicating the time, and user information input by the person requesting to register the color code 20.

According to an embodiment, the identification information may be position information. Where the color code 20 is constituted of four colors as shown in FIG. 2 or 3, each color may represent 256^3 cases and, by combinations of the four colors, may represent 256^12 cases as shown in FIG. 6.

Hence, the Earth representation may be split into 1 cm*1 cm regions, and each region may be matched to four RGB codes, thereby representing the position information with the color code 20. In other words, the position information may be identified in 1 cm*1 cm units by matching each 1 cm*1 cm-split region to the four RGB codes (0,0,0) (0,0,0) (0,0,0) (0,0,0) to (255,255,255) (255,255,255) (255,255,255) (255,255,255).

At this time, the position information may be more specifically identified through the color code 20 by increasing the colors representing the position information.

For example, where the color code 20 is configured to be able to represent eight colors as shown in FIG. 4 or 5, the color code 20 may represent three-dimensional positions on the Earth in 1 cm*1 cm*1 cm units. At this time, the color code 20 may be configured so that the position on the surface is represented by four colors, the depth by three colors, and the altitude by two colors as shown in FIG. 7.

Although the example shown in FIGS. 6 and 7 is described in which the Earth is split to a preset reference size and each region is matched to the RGB code, the reference for splitting the position information is not limited thereto.

For example, the color code 20 may be constituted of four colors to represent the conventional lot number or street number and two colors to represent the floor or suite number of the building and may be matched with the position information.

In another embodiment, the identification information may be time information. As shown in FIG. 8, the time from the beginning of the human history, i.e., BC 3,500, to AD 3,000 may be divided into 0.01 second units which may then be represented as RGB codes. That is, a time from the past to future may be represented finely using two colors.

As another embodiment, the identification information may be user information. As set forth above, since 256^3 cases may be processed with one color, the color code 20 may match one RGB code with user information entered by the user and identify the user information. At this time, the user information may be at least one of company information or product information entered by the registration requester and position reference information available to correct the position information by the GPS but is not limited thereto.

As such, the color code 20 may be constituted of the color corresponding to the RGB code matched to the identification information to provide the identification information.

Such color code 20 may be configured in a preset shape. For example, the color code 20 may be configured in circle as shown in FIG. 3 or 4 or in square as shown in FIGS. 2 and 5, but is not limited to such shape.

Further, the color code 20 may match different types of identification information depending on the shape. For example, the color code 20 configured in circle as shown in FIG. 3 may represent position information using the RGB code representable through four regions 31 to 34, and the color code 20 configured in square as shown in FIG. 2 may display user information using the RGB code representable through four regions 21 to 34.

Further, one color code 20 may match various types of identification information. For example, the color code 20 of FIG. 4 may be constituted of a first region 41 to 44 representing position information, a second region 45 and 46 representing the floor or suite number of the building, and a third region 47 and 48 representing user information.

As such, where several pieces of identification information match one color code 20, the RGB code extracted per region may be individually processed and identification information corresponding thereto may be recognized.

The color code so constituted of colors may be advantageous in that it may be modified or made smaller as compared with other conventional codes.

That is, the conventional code needs to be configured in a preset shape, but the color code may be freely varied in shape.

Further, the conventional code, when made smaller, may be impossible to recognize, but the color code may be recognized although it is made such small that one color is represented with one pixel.

Further, by its ability of matching more identification information by increasing the colors constituting the color code, the color code has more expandability as compared with the conventional code.

Meanwhile, although the description above in connection with FIGS. 2 to 8 regards matching of the color code 20 with position information, time information, or user information, it should be noted that the identification information identifiable via the color code 20 is not limited thereto.

Such color code 20 is matched with identification information and is provided to the issuance requesting terminal 100 and is distributed online. At the request for recognition, the identification information stored mapped with the color code 20 is provided to the recognizing requesting terminal 300.

For such color code processing, color code and identification information may be previously matched with each other and stored. For example, such identification information as position or time, which does not vary is required to previously be mapped with RGB code so that the RGB code corresponding to a particular position or time may be discovered and a color code constituted of colors corresponding thereto may be issued and that the particular position and particular time corresponding to the RGB code corresponding to the color code may be recognized.

In contrast, user information, which is relative information transmitted by the issuance requesting device, needs to be stored matching the available RGB code at the user's request so that the color code may be generated and processed.

Figure 9:
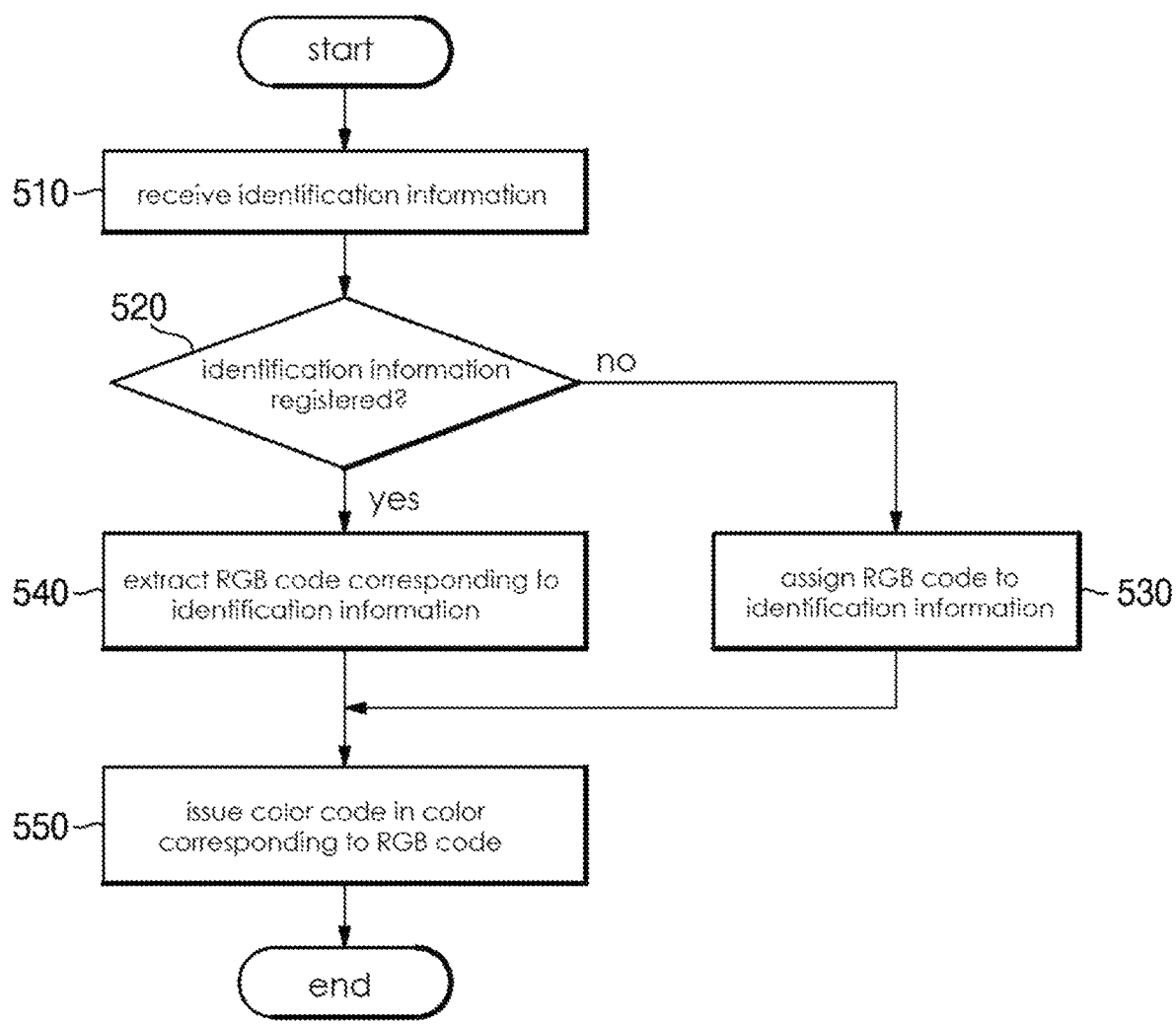
FIG. 9 is a flowchart schematically illustrating a method of issuing a code according to an embodiment.

A method of issuing a color code as described above is described below with reference to FIG. 9. FIG. 9 is a flowchart schematically illustrating a method of issuing a code according to an embodiment.

Referring to FIG. 9, the code processing device 200 receives identification information from the issuance requesting terminal 100 (510). At this time, the identification information received by the code processing device 200 means information to be provided through color code and may be one of a particular position, a particular time, or user information, but not limited thereto.

The code processing device 200 determines whether the received identification information is registered information (520). As set forth above, the absolute identification information, e.g., position or time, is mapped with RGB code and stored in database for processing of color code. However, user information, which is mapped to color code at the request of the code registering terminal, requires allocation of RGB code and, thus, the code processing device 200 may determine whether the identification information is pre-registered information.

If the received identification information is registered information (yes in 520), the code processing device 200 extracts the RGB code corresponding to the identification information (540). That is, if the identification information is information previously mapped with RGB code, such as position or time, the RGB code corresponding to the position or time received is extracted.

On the other hand, if the received identification information is information not registered (no in 520), the code processing device 200 assigns RGB code to the identification information (530). For example, unless the user information is stored by the issuance requesting terminal 100 the code processing device 200 may discover the RGB code to which no other information is mapped, map user information to the discovered RGB code, and store them.

The code processing device 200 discovers the RGB code corresponding to the received identification information and issues a color code in the color corresponding to the RGB code (550). For example, the code processing device 200 may determine a color of a first region of the color code using the RGB code corresponding to the position and determine a color of a second region of the color code using the RGB code assigned to the user information to generate the color code and transmit the generated code to the issuance requesting device, thereby issuing the color code.

The so-generated color code may be distributed through electronic documents, and the identification information mapped to the color code may be provided through the color code distributed through the electronic documents.

Figure 10:
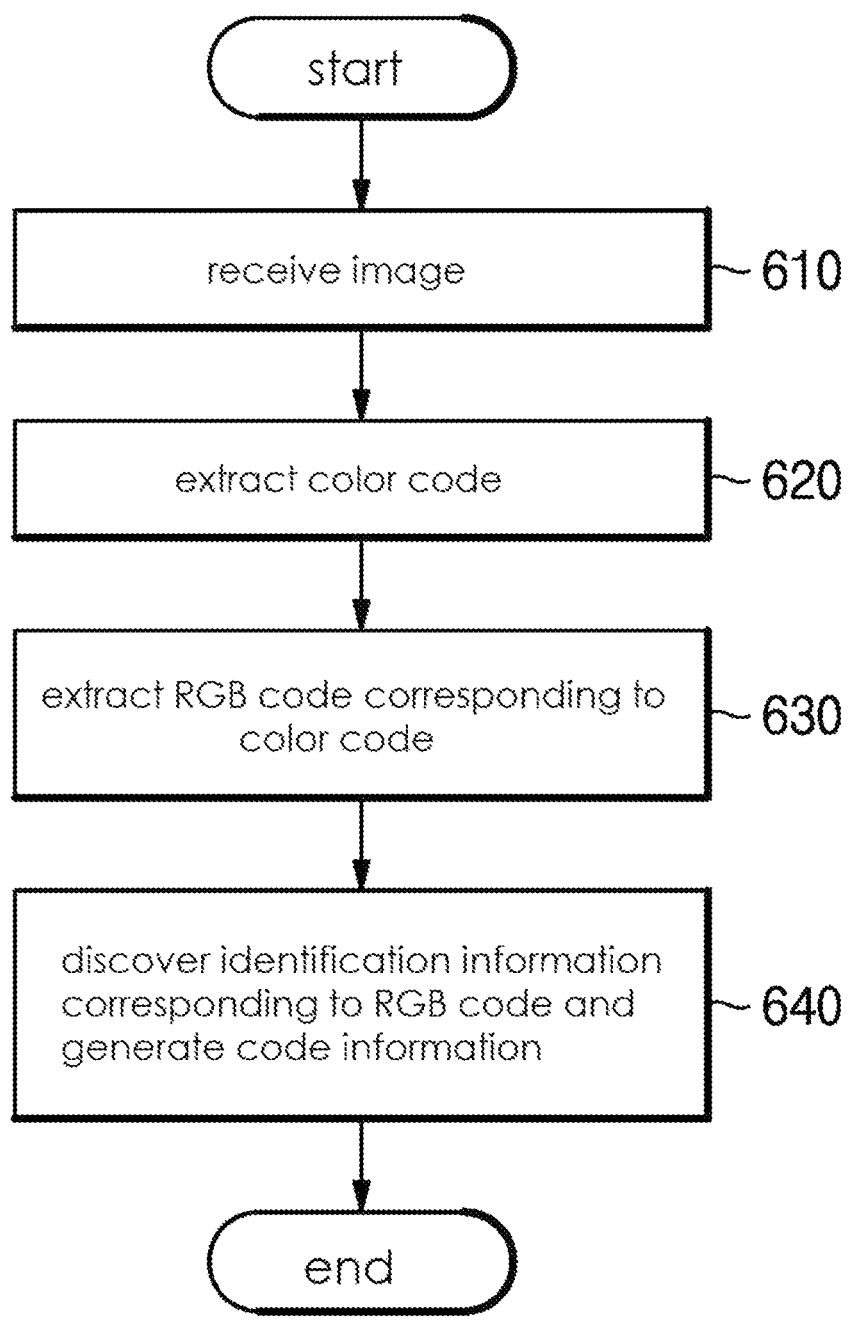
FIG. 10 is a flowchart schematically illustrating a code recognition method according to an embodiment.

A method of recognizing a registered color code is described below in detail with reference to FIG. 10. FIG. 10 is a flowchart schematically illustrating a code recognition method according to an embodiment.

Referring to FIG. 10, the code processing device 200 receives an electronic document from the recognizing requesting terminal 300 (610). At this time, the electronic document may be, e.g., a web document or word document and, in some cases, only color code may be electronically received. In such a case where only color code is electronically received, the step of extracting color code may be omitted.

The code processing device 200 extracts the color code (620). Specifically, the code processing device 200 may discover a region corresponding to a preset shape and extract the discovered region as a color code. However, methods of extracting a color code are not limited thereto.

The code processing device 200 extracts the RGB code from the color code (630). That is, the RGB code corresponding to the color constituting the color code may be extracted.

At this time, where the color code is constituted of a plurality of colors as described above, the code processing device 200 may split the color code into a plurality of regions according a preset reference and extract the RGB code corresponding to the color represented in each region.

The code processing device 200 discovers identification information corresponding to the RGB code and recognizes the color code (640). Specifically, the code processing device 200 may discover the identification information matching the RGB code in the color code registration process or color code issuing process as described above and recognize the color code.

At this time, where a plurality of pieces of identification information are contained in one color code, different types of identification information may be discovered according to the region where the RGB code is extracted.

Described below in detail is a code processing device 200 of performing code issuance and code recognition as described above.

Figure 11:
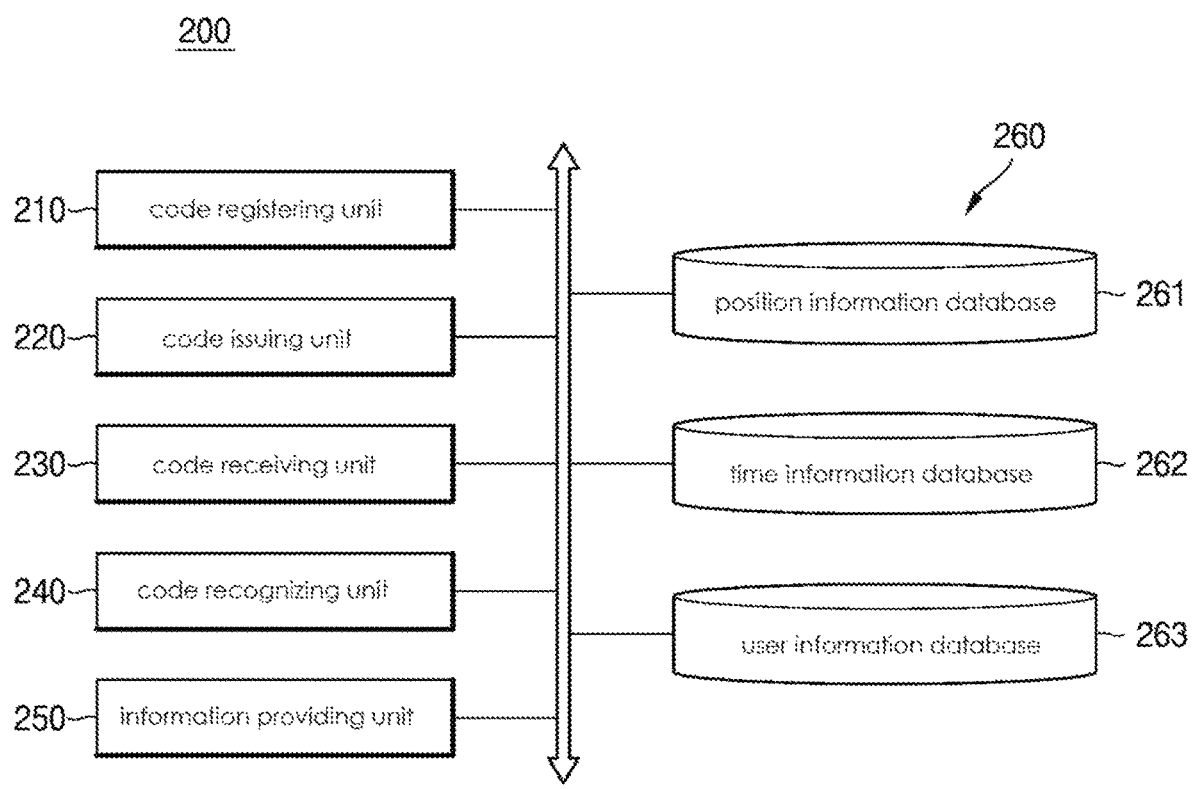
FIG. 11 is a view schematically illustrating a configuration of a code processing device according to an embodiment.
Figure 12:
FIG. 12 is a view illustrating an example electronic document containing a color code.

FIG. 11 is a view schematically illustrating a configuration of a code processing device 200 according to an embodiment. FIG. 12 is a view illustrating an example electronic document containing a color code.

Referring to FIG. 11, the code processing device 200 includes a code registering unit 210, a code issuing unit 220, a code receiving unit 230, a code recognizing unit 240 an information providing unit 250, and a code database 260.

The code registering unit 210 maps identification information and RGB code and stores them. At this time, the identification information and the RGB code may be matched in the form of a database and stored in the code database 260. The code database 260 may be generated per piece of identification information.

The code registering unit 210 may map position information to the RGB code, thereby generating a position information database 261. Specifically, the code registering unit 210 splits a preset area (e.g., the entire Earth) according to a preset reference.

At this time, the preset area may be split according to a preset size, the street address or lot number address to indicate the address. Further, as described above, the position information may be subdivided according to the floor or suite number of the building.

If the preset area is split, the code registering unit 210 may match the RGB code to each area section and generate the position information database 261.

At this time, the RGB codes may sequentially be matched from a reference position. If the RGB codes are sequentially mapped from the reference position, the area section adjacent to the reference position may be represented in the same color as the reference position, and the area section away from the reference position may be represented in a different color from the reference position and, thus, the position may be approximately recognized through the color code itself.

Further, the code registering unit 210 may map time information to the RGB code and generate a time information database 262. Specifically, the code registering unit 210 may split a time according to a preset reference and match the RGB code to each time section, thereby generating the time information database 262.

At this time, the RGB codes may sequentially be matched from a reference time. If the RGB codes are sequentially mapped from the reference time, the time section adjacent to the reference time may be represented in the same color as the reference time, and the time section away from the reference time may be represented in a different color from the reference time and, thus, the time may be approximately recognized through the color code itself.

The code registering unit 210 may map user information to the RGB code, thereby generating a user information database 263.

Specifically, if user information is received from the issuance requesting terminal 100, the code registering unit 210 may discover the RGB code to which no other information is assigned and map the discovered RGB code with the user information to thereby generate a user information database 263.

Meanwhile, identification information may be matched with a plurality of RGB codes. Since 255^3 cases may be represented through one color as described above, a plurality of RGB codes and the identification information may be matched with each other according to the number of pieces of identification information.

For example, position information may be matched with eight RGB codes, thereby configuring a color code constituted of eight colors as shown in FIG. 5. At this time, a different piece of position information may be represented in each region of the color code. For example, height (altitude) information may be represented in a first region 51 to 53 constituted of three colors, depth information may be represented in a second region 55 and 56 constituted of two colors, and area information may be represented in a third region 54 and 57 to 59 constituted of four colors. That is, one position is stored matched with eight RGB codes according to the area, altitude, and depth.

The code issuing unit 220 issues a color code at the request of the issuance requesting terminal 100. The RGB code corresponding to the identification information received from the issuance requesting terminal 100 may be discovered from the code database 260, and the color code may be constituted of the color corresponding thereto.

According to an embodiment, the code issuing unit 220 may discover the RGB code corresponding to the position information received from the issuance requesting terminal 100 using the above-described position information database 261, and the discovered RGB code may be used to constitute the color code. At this time, where the position information matches a plurality of RGB codes, the code issuing unit 220 may array the colors corresponding to the RGB codes according to a preset reference and the color code may be generated.

According to another embodiment, the code issuing unit 220 may discover the RGB code corresponding to the time information received from the issuance requesting terminal 100 using the above-described time information database 262, and the discovered RGB code may be used to constitute the color code. At this time, where the time information matches a plurality of RGB codes, the code issuing unit 220 may array the colors corresponding to the RGB codes according to a preset reference and the color code may be generated.

According to still another embodiment, the code issuing unit 220 may discover the RGB code corresponding to the user information received from the issuance requesting terminal 100 using the above-described user information database 263, and the discovered RGB code may be used to constitute the color code.

At this time, where the received user information is not stored in the user information database 263, the code issuing unit 220 may request the code registering unit 210 to store the user information and, thus, the code issuing unit 220 may assign the available RGB code, match the assigned RGB code with the user information, and update the user information database 263 therewith.

As such, where the user information managed by the user information database 263 matches a plurality of RGB codes, the code issuing unit 220 may array the colors corresponding to the RGB codes according to a preset reference and the color code may be generated.

Meanwhile, the code issuing unit 220 may determine the shape of color code according to the type of identification information displayed by the color code according to the preset reference. That is, the color code may be generated so that the code indicating position information, time information, user information, or a plurality of pieces of information has a different shape.

By varying the shape of color code depending on the type of identification information, more various types of identification information may be provided.

Further, the code issuing unit 220 may split the color code into a plurality of regions according to a preset reference and represent each region with a color corresponding to a different type of identification information.

For example, the code issuing unit 220 may split the color code into three regions according to a preset reference and generate the color code by selecting the color of a first region according to the RGB code corresponding to position information, selecting the color of a second region according to the RGB code corresponding to time information, and selecting the color of a third region according to the RGB code corresponding to user information.

If the color code is generated through the above-described process, the code issuing unit 220 may transmit the generated code to the issuance requesting terminal 100, thereby completing code issuance.

The issuance requesting terminal 100 may include the so-issued color code in various electronic documents and distribute them. For example, the issuance requesting terminal 100 may add the color code 20 to a trademark 70 and distribute it as shown in FIG. 12.

Then, the recognizing requesting terminal 300 receiving the trademark 70 in an electronic manner may receive identification information, such as pre-matched position, time, company information, or product information, using the color code 20 added to the trademark 70. Now described in detail is a configuration of processing the providing of identification information.

The code receiving unit 230 receives the electronic document from the recognizing requesting terminal 300. The code receiving unit 230 may discover the color code from the received electronic document and extract the color code to be recognized.

For example, where the trademark 70 as shown in FIG. 12 is received from the recognizing requesting terminal 300, the code receiving unit 230 may extract the color code 20 corresponding to a preset circle from the trademark 70.

The code recognizing unit 240 may recognize the color code extracted from the code receiving unit 230.

Specifically, the code recognizing unit 240 may extract the RGB code corresponding to the color constituting the color code and extract the identification information stored matched with the RGB code extracted from the code database 260 generated by the code registering unit 210, recognizing the color code.

At this time, where the color code is constituted of a plurality of colors, the code recognizing unit 240 may split the color code into a plurality of regions according to a preset reference and discover identification information matched with a plurality of RGB codes extracted from the regions in the code database 260, recognizing the code.

Meanwhile, where different pieces of identification information are matched according to the shape of the code, the code recognizing unit 240 may determine the database to be used for code recognition according to the shape of the code. For example, where position information is provided in a circular color code and time information is provided in a rectangular color code, the color code may be recognized using the position information database 261 if the color code is circular and using the time information database 262 if the color code is rectangular.

Further, where a plurality of pieces of identification information are matched with the color code as set forth above, the color code may be recognized, with the type of code database 260 where the identification information is to be discovered varied depending on the region where the RGB code is extracted.

The information providing unit 250 may transmit identification information corresponding to the color code extracted from the code recognizing unit 240 to the recognizing requesting terminal 300.

As set forth above, the color code constituted of colors and the color code processing system may provide, in a simplified manner, as various pieces of identification information as incomparable with word enumeration.

Further, identification information may be provided using colors easy to recognize, but rather than language or symbols, thereby leading to a free reshaping of the color code and easier recognition of identification information although resized.

Further, as the color code is defined with RCG codes processible in hexadecimal, data management and processing may be easily performed, and compatibility with various applications may be increased.

Meanwhile, the present invention also encompasses methods of identification and code processing using patterns produced by combinations of RGB values (colors), as well as RGB values of code issued in a processing method for uniquely recognizing code even when code is varied (e.g., retouched, scaled, rotated, translated, flipped, or rectified).

It will be appreciated by one of ordinary skill in the art to which embodiments of the present invention pertain that various changes may be made without departing from essential features of the disclosure. Hence, the methods disclosed herein should be interpreted not as limiting but as illustrative. The scope of the present invention is defined in the appended claims but not in the detailed description, and all differences within an equivalent scope thereof should be interpreted as belonging to the scope of the present invention.

The invention claimed is:

1. A code processing device processing a color code constituted of a color defined as RGB, the code processing device comprising:
    a code receiving unit receiving the color code from a recognition requesting terminal; and
    a code recognizing unit extracting at least one RGB code corresponding to each color constituting the color code and recognizing identification information corresponding to the at least one RGB code using a code database storing identification information according to RGB codes, and
    a code providing unit transmitting the identification information to the recognition requesting terminal,
    wherein the code database includes at least one of a position information database in which a position and an RGB code match each other, a time information database in which a time and an RGB code match each other, and a user information database in which user information entered by an issuance requesting terminal and an RGB code match each other,
wherein the code recognizing unit, where the color code matches different types of identification information depending on the shape of the color code, determines a database to use for recognizing the color code according to the shape,
wherein the code recognizing unit splits the color code into a plurality of regions according to a preset reference and discovers identification information matched with a plurality of RGB codes extracted from the regions in the code database, and
where a plurality of pieces of identification information are matched with the color code, the color code is recognized, with the type of code database where the identification information is to be discovered, varied depending on the region where the RGB code is extracted.

2. The code processing device of claim 1, wherein the code receiving unit extracts the color code with a preset shape from an electronic document received from the recognition requesting terminal.

3. The code processing device of claim 1, further comprising a code registering unit splitting a designated position into a plurality of areas according to a preset reference and matching a different RGB code to each of the areas to generate the position information database.

4. The code processing device of claim 1, further comprising a code registering unit matching the user information with an RGB code to which no RGB code is matched if the user information including company information or product information is received.

5. A code processing method using the code processing device of claim 1, the code processing method comprising:
a code registering step of matching an RGB code with identification information to generate a code database; and
a recognizing step, if receiving a color code from a recognition requesting terminal, extracting at least one RGB code from the color code and recognizing identification information corresponding to the at least one RGB code using a code database previously storing identification information according to RGB codes.

6. The code processing method of claim 5, wherein the code registering step includes the steps of splitting a designated position into a plurality of areas according to a preset reference and matching a different RGB code to each of the areas to generate a position information database and, if user information including company information or product information is received from an issuance requesting terminal, matching the user information with an RGB code to which no information is matched to update a user information database.

7. The code processing method of claim 5, further comprising the steps of:
discovering a first RGB code corresponding to a position received from the issuance requesting terminal using the position information database;
discovering a second RGB code corresponding to the user information using the user information database; and
transmitting, to the issuance requesting terminal, the color code in which a color of a first region is selected according to the first RGB code and a color of a second region is selected according to the second RGB code.

8. The code recognition method of claim 7, wherein the recognizing step includes the steps of:
extracting the color code from an electronic document received from the recognition requesting terminal;
splitting the extracted color code into the first region and the second region according to a preset reference;
extracting an RGB code corresponding to a color extracted from each region;
discovering an area corresponding to an RGB code extracted from the first region using the position information database and discovering user information corresponding to an RGB code extracted from the second region using the user information database; and
transmitting information about the discovered area and the user information to the recognition requesting terminal.

9. A code processing method for processing a color code constituted of a color defined as RGB, the code processing method comprising:
receiving the color code;
extracting at least one RGB code corresponding to each color constituting the color code and recognizing identification information corresponding to the at least one RGB code using a code database which stores identification information according to RGB codes, and
transmitting the identification information, wherein
the code database includes at least one of a position information database in which a position and an RGB code match each other, a time information database in which a time and an RGB code match each other, and a user information database in which user information entered by an issuance requesting terminal and an RGB code match each other;
determining a database to use for recognizing the color code according to the shape in a case that the color code matches different types of identification information depending on the shape of the color code;
splitting the color code into a plurality of regions according to a preset reference and discovers identification information matched with a plurality of RGB codes extracted from the regions in the code database; and
matching a plurality of pieces of identification information with the color code, wherein the color code is recognized, with the type of code database where the identification information is to be discovered, varied depending on the region where the RGB code is extracted.

10. The code processing method of claim 9, further comprising:
extracting the color code with a preset shape from a received electronic document.

11. The code processing method of claim 9, further comprising:
splitting a designated position into a plurality of areas according to a preset reference; and
matching a different RGB code to each of the areas to generate the position information database.

12. The code processing method of claim 9, further comprising:
matching the user information with an RGB code to which no RGB code in a case where the user information including company information or product information is received.

* * * * *